(12) United States Patent
Li et al.

(10) Patent No.: US 12,328,577 B2
(45) Date of Patent: Jun. 10, 2025

(54) SUBSCRIPTION INFORMATION PROCESSING METHOD AND APPARATUS, AND DEVICE

(71) Applicant: HUAWEI TECHNOLOGIES CO., LTD., Shenzhen (CN)

(72) Inventors: Shikun Li, Shanghai (CN); Li Hu, Shanghai (CN); Weisheng Jin, Shanghai (CN); Zhengyang Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/752,337

(22) Filed: May 24, 2022

(65) Prior Publication Data

US 2022/0286855 A1 Sep. 8, 2022

Related U.S. Application Data

(63) Continuation of application No. PCT/CN2020/103739, filed on Jul. 23, 2020.

(30) Foreign Application Priority Data

Nov. 26, 2019 (CN) .......................... 201911176692.4

(51) Int. Cl.
*H04W 12/08* (2021.01)
*H04W 8/18* (2009.01)
(Continued)

(52) U.S. Cl.
CPC ............. *H04W 12/08* (2013.01); *H04W 8/18* (2013.01); *H04W 12/71* (2021.01); *H04W 12/72* (2021.01)

(58) Field of Classification Search
CPC ....... H04W 12/08; H04W 8/18; H04W 12/71; H04W 12/72; H04W 8/20; H04W 12/06; H04L 9/3273; H04L 2209/80
See application file for complete search history.

(56) References Cited

U.S. PATENT DOCUMENTS

2006/0265339 A1* 11/2006 Vakil .................. G06Q 20/1235
705/76
2008/0077995 A1* 3/2008 Curnyn ................ H04L 63/1441
726/27
(Continued)

FOREIGN PATENT DOCUMENTS

CN 101657039 A 2/2010
CN 102045688 A * 5/2011 ............ H04W 24/00
(Continued)

OTHER PUBLICATIONS

Chinese Office Action issued in corresponding Chinese Application No. 201911176692.4, dated Jul. 15, 2022, pp. 1-8.
(Continued)

*Primary Examiner* — Yuwen Pan
*Assistant Examiner* — Swati Jain
(74) *Attorney, Agent, or Firm* — HAUPTMAN HAM, LLP (57) ABSTRACT

A subscription information processing method and apparatus, and a device. The method includes: An access control device obtains authorization information from a target network device, where the authorization information includes an identifier of a first terminal and authorization operation indication information for subscription information of the first terminal; the access control device obtains a subscription information processing request from a second terminal, where the subscription information processing request includes an identifier of the second terminal; and the access control device processes subscription information corre-
(Continued)

sponding to the identifier of the second terminal based on the authorization operation indication information in response to the identifier of the first terminal matching the identifier of the second terminal.

15 Claims, 6 Drawing Sheets

(51) Int. Cl.
    *H04W 12/71*     (2021.01)
    *H04W 12/72*     (2021.01)

(56) References Cited

U.S. PATENT DOCUMENTS

| | | | | |
|---|---|---|---|---|
| 2012/0297473 | A1* | 11/2012 | Case | H04W 4/70 |
| | | | | 726/10 |
| 2015/0180851 | A1 | 6/2015 | Zou et al. | |
| 2016/0021635 | A1* | 1/2016 | Lee | H04W 12/08 |
| | | | | 455/411 |
| 2016/0165433 | A1* | 6/2016 | Larignon | H04W 8/205 |
| | | | | 455/419 |
| 2016/0277956 | A1* | 9/2016 | Lindheimer | H04W 36/0022 |
| 2018/0103336 | A1* | 4/2018 | Lihosit | H04W 4/50 |
| 2020/0195747 | A1* | 6/2020 | Park | H04W 12/06 |
| 2020/0259853 | A1* | 8/2020 | Alfano | H04W 12/033 |

FOREIGN PATENT DOCUMENTS

| | | | |
|---|---|---|---|
| CN | 102404738 | A * | 4/2012 |
| CN | 106537943 | A | 3/2017 |
| CN | 106998552 | A | 8/2017 |
| CN | 108076452 | A | 5/2018 |
| CN | 109196891 | A | 1/2019 |
| CN | 112954694 | B | 5/2023 |
| EP | 2792177 | A1 | 10/2014 |
| EP | 3261371 | A1 | 12/2017 |
| WO | 2016138323 | A1 | 9/2016 |
| WO | 2018098713 | A1 | 6/2018 |

OTHER PUBLICATIONS

International Search Report issued in corresponding International Application No. PCT/CN2020/103739, dated Oct. 28, 2020, pp. 1-9.
Chinese Office Action issued in corresponding Chinese Application No. 201911176692.4, dated Dec. 2, 2022, pp. 1-7.
Extended European Search Report issued in corresponding European Application No. 20892465.4, dated Nov. 21, 2022, pp. 1-8.

\* cited by examiner

SUBSCRIPTION INFORMATION PROCESSING METHOD AND APPARATUS, AND DEVICE

CROSS-REFERENCE TO RELATED APPLICATIONS

This application is a continuation of International Application No. PCT/CN2020/103739, filed on Jul. 23, 2020, which claims priority to Chinese Patent Application No. 201911176692.4, filed on Nov. 26, 2019. The disclosures of the aforementioned applications are hereby incorporated by reference in their entireties.

BACKGROUND

In a communication system such as a 3rd generation partnership project (3rd generation partnership project, 3GPP), MulteFire, or a long term evolution-unlicensed (long term evolution-unlicensed, LTE-U) system, whether a terminal accesses a network and quality of service enjoyed by the terminal after the terminal accesses the network usually depend on subscription information between the terminal and the network. For example, when the terminal does not have the subscription information to the network, the terminal is not capable of accessing the network; or when the subscription information between the terminal and the network represents that the network provides 10 M (megabits) bandwidth for the terminal, the network provides a service corresponding to a maximum of 10 M bandwidth for the terminal, and the terminal cannot enjoy a service corresponding to a higher bandwidth.

When the subscription information between the terminal and the network is changed, legality of the change in the subscription information is a problem that is to be focused on.

SUMMARY

At least one embodiment provides a subscription information processing method, to improve legality of a change in subscription information.

According to a first aspect, at least one embodiment provides a subscription information processing method. The method includes: An access control device obtains authorization information from a target network device, where the authorization information includes an identifier of a first terminal and authorization operation indication information for subscription information of the first terminal; the access control device obtains a subscription information processing request from a second terminal, where the subscription information processing request includes an identifier of the second terminal; and the access control device processes subscription information corresponding to the identifier of the second terminal based on the authorization operation indication information when the identifier of the first terminal matches the identifier of the second terminal, where the subscription information corresponding to the identifier of the second terminal is prestored in the access control device. In this implementation, the access control device correspondingly processes the subscription information of the second terminal in response to the target network device providing the authorization information. In this way, in response to a terminal being illegally stolen and unilaterally requesting the access control device to process subscription information of the terminal, because a current operator of the terminal cannot trigger the target network device to send the subscription information of the terminal to the access control device, the access control device does not process, based on a unilateral request of the terminal, the subscription information corresponding to the terminal, so that legality of processing the subscription information of the terminal is improved.

In at least one embodiment, the method further includes: The access control device performs identity authentication on the second terminal; and that the access control device processes subscription information corresponding to the identifier of the second terminal based on the operation indication information when the identifier of the first terminal matches the identifier of the second terminal is: The access control device processes the subscription information corresponding to the identifier of the second terminal based on the operation indication information when the identifier of the first terminal matches the identifier of the second terminal and the identity authentication on the second terminal succeeds. In this implementation, before processing the subscription information of the second terminal, the access control device further authenticates whether an identity of the second terminal is legal, and processes the subscription information of the second terminal in response to the identity authentication on the second terminal succeeding. In this way, processing on the subscription information of the second terminal is avoided when a terminal requesting the access control device to process the subscription information is illegal, for example, when an illegal terminal requests the access control device to process the subscription information of the second terminal.

In at least one embodiment, that the access control device performs identity authentication on the second terminal includes: The access control device sends a first challenge value and a second random number to the second terminal, where the first challenge value is calculated by the access control device based on a first key value and a first random number that is from the second terminal, and the first key value is determined by the access control device based on the identifier of the second terminal; the access control device calculates a response value based on the first key value and the second random number; and when the response value is the same as a second challenge value from the second terminal, the access control device determines that the identity authentication on the second terminal succeeds, where the second challenge value is calculated based on a second key value on the second terminal and the second random number. In this implementation, the access control device authenticates the legality of the second terminal in a challenge-acknowledgment manner. In this way, two-way authentication between the second terminal and the access control device is implemented. When there is a problem with legality of either the second terminal or the access control device, the subscription information of the second terminal cannot be processed. Therefore, security of processing the subscription information is further improved.

In at least one embodiment, that the access control device processes subscription information corresponding to the identifier of the second terminal based on the operation indication information when the identifier of the first terminal matches the identifier of the second terminal is: The access control device processes the subscription information corresponding to the identifier of the second terminal based on the operation indication information when the identifier of the first terminal matches the identifier of the second terminal and duration of receiving the authorization information by the access control device does not exceed effective duration of the authorization information. In this implementation, the authorization information has a validity period. Within the validity period of the authorization information, the access control device processes the subscription information of the corresponding terminal. However, when the effective duration of the authorization information expires, the access control device refuses to process the subscription information of the terminal. In this way, the second terminal still processes the subscription information subsequently in an illegal situation after requesting the access control device to process the subscription information once.

In at least one embodiment, the authorization operation indication information is used to indicate to delete or update the subscription information of the first terminal.

In at least one embodiment, in response to the authorization operation indication information being used to indicate to update the subscription information of the first terminal, the authorization information further includes updated subscription information. In at least one embodiment, the access control device parses the updated subscription information from the received authorization information, to update the stored subscription information by using the updated subscription information.

In at least one embodiment, the method further includes: In response to the access control device finishing processing the subscription information corresponding to the identifier of the second terminal based on the authorization operation indication information, the access control device deletes the authorization information obtained from the target network device. In at least one embodiment, after finishing processing the subscription information, the access control device deletes the received authorization information. In this way, in response to the second terminal requesting the access control device to process the subscription information of the second terminal again, and the target network device has not granted authorization again, the access control device refuses to process the subscription information. Therefore, an illegal user of the second terminal is prevented from requesting to perform an illegal operation on the subscription information of the second terminal.

According to a second aspect, at least one embodiment further provides a subscription information processing apparatus. The apparatus is applied to an access control device. The apparatus includes:

a first obtaining module, configured to obtain authorization information from a target network device, where the authorization information includes an identifier of a first terminal and authorization operation indication information for subscription information of the first terminal; a second obtaining module, configured to obtain a processing request from an access network device, where the processing request includes an identifier of a second terminal; and a processing module, configured to: process subscription information corresponding to the identifier of the second terminal based on the authorization operation indication information in response to the identifier of the first terminal matching the identifier of the second terminal, where the subscription information corresponding to the identifier of the second terminal is prestored in the access control device.

In at least one embodiment, the apparatus further includes: an authentication module, configured to perform identity authentication on the second terminal; and the processing module is configured to process the subscription information corresponding to the identifier of the second terminal based on the operation indication information in response to the identifier of the first terminal matching the identifier of the second terminal and the identity authentication on the second terminal succeeds.

In at least one embodiment, the authentication module includes: a sending unit, configured to send a first challenge value and a second random number to the second terminal, where the first challenge value is calculated by the access control device based on a first key value and a first random number that is from the second terminal, and the first key value is determined by the access control device based on the identifier of the second terminal; a calculation unit, configured to calculate a response value based on the first key value and the second random number; and a determining unit, configured to: in response to the response value being the same as a second challenge value from the second terminal, determine that the identity authentication on the second terminal succeeds, where the second challenge value is calculated based on a second key value on the second terminal and the second random number.

In at least one embodiment, the processing module is configured to process the subscription information corresponding to the identifier of the second terminal based on the operation indication information in response to the identifier of the first terminal matching the identifier of the second terminal and duration of receiving the authorization information by the access control device does not exceed effective duration of the authorization information.

In at least one embodiment, the authorization operation indication information is used to indicate to delete or update the subscription information of the first terminal.

In at least one embodiment, in response to the authorization operation indication information being used to indicate to update the subscription information of the first terminal, the authorization information further includes updated subscription information.

In at least one embodiment, the apparatus further includes: a deletion module, configured to: in response to the access control device finishing processing the subscription information corresponding to the identifier of the second terminal based on the authorization operation indication information, delete the authorization information obtained from the target network device.

The subscription information processing apparatus provided in the second aspect corresponds to the subscription information processing method provided in the first aspect. Therefore, for various embodiments of the subscription information processing apparatus provided in the second aspect, refer to the various embodiments of the subscription information processing method provided in the first aspect.

According to a third aspect at least one embodiment further provides a device. The device includes a processor and a memory. The processor is coupled to the memory. The memory is configured to store a computer program or instructions. The processor is configured to execute the computer program or instructions, so that the subscription information processing method according to at least one embodiment of the first aspect is performed.

According to a fourth aspect, at least one embodiment further provides a computer-readable storage medium, including instructions. In response to the instructions being run on a computer, the computer is enabled to perform the subscription information processing method according to at least one embodiment of the first aspect.

According to a fifth aspect, at least one embodiment further provides a computer-readable storage medium. The computer-readable storage medium stores a program used to implement the subscription information processing method according to at least one embodiment of the first aspect. For example, in response to the program being run on an access control device, the access control device is enabled to perform the subscription information processing method according to at least one embodiment of the first aspect.

According to a sixth aspect, at least one embodiment provides a computer program product. The program product includes a program. In response to the program being run, the subscription information processing method according to at least one embodiment of the first aspect is performed.

In at least one embodiment, before processing the subscription information of the terminal, the access control device obtains authorization information from the target network device, where the authorization information includes the identifier of the first terminal and the authorization operation indication information for the subscription information of the first terminal. In this way, the access control device determines that the subscription information of the first terminal is allowed to be correspondingly processed currently based on the authorization information. Then, the access control device obtains a subscription information processing request from a second terminal, where the processing request includes the identifier of the second terminal. In response to the identifier of the second terminal in the subscription information processing request matching the identifier of the first terminal in the authorization information, the identifier indicates that the first terminal and the second terminal are a same terminal. Therefore, a processing operation performed by the access control device on the subscription information of the second terminal is a legal operation. In this case, the access control device processes, based on the authorization operation indication information, the subscription information corresponding to the identifier of the second terminal, where the subscription information corresponding to the identifier of the second terminal is prestored in the access control device. In at least one embodiment, the access control device correspondingly processes the subscription information of the second terminal in response to the target network device providing the authorization information. In this way, in response to a terminal being illegally stolen and unilaterally requesting the access control device to process subscription information of the terminal, because a current operator of the terminal cannot trigger the target network device to send the subscription information of the terminal to the access control device, the access control device does not process, based on a unilateral request of the terminal, the subscription information corresponding to the terminal, so that legality of processing the subscription information of the terminal is improved.

BRIEF DESCRIPTION OF DRAWINGS

To describe technical solutions in embodiments described herein more clearly, the following briefly describes the accompanying drawings for describing the embodiments. The accompanying drawings in the following descriptions show some embodiments, and a person of ordinary skill in the art may derive other drawings from these accompanying drawings.

DESCRIPTION OF EMBODIMENTS

A terminal accessing a network usually has corresponding subscription information stored in the network. The subscription information enables the terminal to have a right to access the network and enable the network to provide a service of corresponding quality for the terminal. In at least one embodiment, the subscription information between the terminal and the network is able to be changed. For example, in response to an enterprise recalling a terminal, the terminal is reset. Correspondingly, the network deletes subscription information of the reset terminal that has been stored in the network.

However, in at least one embodiment, the terminal is directly reset, so that the network deletes the subscription information corresponding to the terminal, and there is a security risk. For example, in response to an illegal user stealing the terminal and directly resetting the terminal, the network deletes the subscription information of the terminal based on this operation, and the illegal user starts to use the terminal or use the terminal for other purposes. Therefore, when the subscription information of the terminal is changed, legality of the change is focused.

Based on this, at least one embodiment provides a subscription information processing method, to improve legality of processing subscription information of a terminal. Before processing subscription information of a terminal, an access control device obtains authorization information from a target network device, where the authorization information includes an identifier of a first terminal and authorization operation indication information for subscription information of the first terminal. In this way, the access control device determines that the subscription information of the first terminal is allowed to be correspondingly processed currently based on the authorization information. Then, the access control device obtains a subscription information processing request from a second terminal, where the processing request includes an identifier of the second terminal. In response to the identifier of the second terminal in the subscription information processing request matching the identifier of the first terminal in the authorization information, the identifier indicates that the first terminal and the second terminal are a same terminal. Therefore, a processing operation performed by the access control device on subscription information of the second terminal is a legal operation. In this case, the access control device processes, based on the authorization operation indication information, the subscription information corresponding to the identifier of the second terminal, where the subscription information corresponding to the identifier of the second terminal is prestored in the access control device. In at least one embodiment, the access control device correspondingly processes the subscription information of the second terminal in response to the target network device providing the authorization information. In this way, in response to a terminal being illegally stolen and unilaterally requesting the access control device to process subscription information of the terminal, because a current operator of the terminal cannot trigger the target network device to send the subscription information of the terminal to the access control device, the access control device does not process, based on a unilateral request of the terminal, the subscription information corresponding to the terminal, so that legality of processing the subscription information of the terminal is improved.

Figure 1:
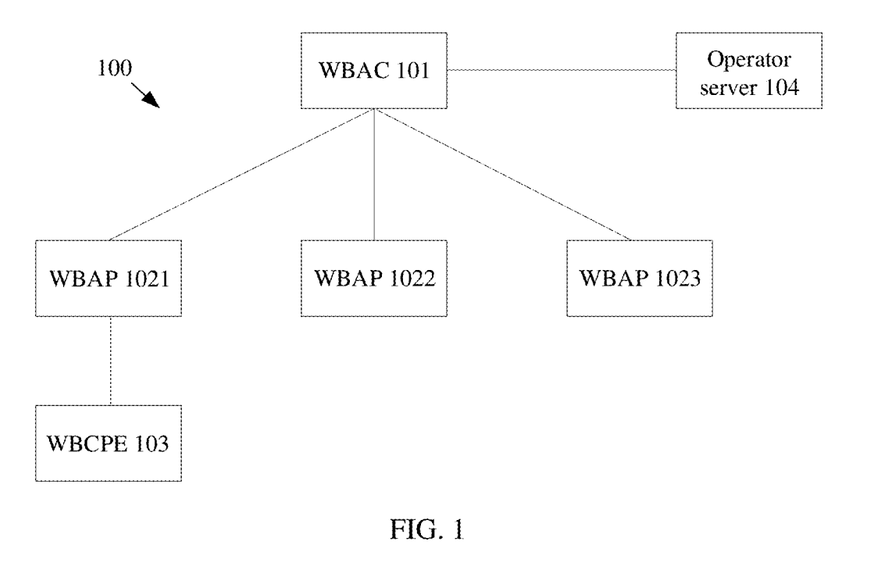
FIG. 1 is a schematic diagram of a structure of a communication system according to at least one embodiment.

In an example, the technical solution in at least one embodiment is applied to an example of a communication system similar to a wireless local area network (wireless local area network, WLAN) thin AP (access point)+AC (access controller) minimal deployment architecture/protocol shown in FIG. 1. In the communication system 100, a wide-band access controller (wide-band access point controller, WBAC) 101 is connected to a plurality of wide-band access points (wide-band access point, WBAP). As shown in FIG. 1, the WBAC 101 is separately connected to a WBAP 1021, a WBAP 1022, and a WBAP 1023 in a wired or wireless manner. A WBAP accesses wide-band customer premises equipment (wide-band customer premises equipment, WBCPE). In FIG. 1, for example, the WBAP 1021 accesses WBCPE 103. In addition, the WBAC 101 is connected to an operator (such as a communication operator or an industry operator) server 104.

Before the WBAC 101 processes subscription information corresponding to the WBCPE 103, the operator server 104 sends authorization information to the WBAC 101. The authorization information includes an identifier of WBCPE corresponding to the subscription information allowed to be processed and authorization operation indication information for the subscription information of the WBCPE. In addition, the WBCPE 103 alternatively sends a subscription information processing request to the WBAC 101 through the WBAP 1021. The subscription information processing request includes an identifier of the WBCPE 103. After the WBAC 101 receives the authorization information and the subscription information processing request, in response to determining that the identifier of the WBCPE 103 included in the subscription information processing request matches the identifier of the WBCPE corresponding to the subscription information allowed to be processed and included in the authorization information, the WBAC 101 processes, based on the authorization operation indication information, the subscription information corresponding to the identifier of the WBCPE 103. Certainly, the subscription information corresponding to the identifier of the WBCPE 103 is pre-stored in the WBAC 101.

At least one embodiment is applied to any suitable communication system, and is not limited to the foregoing example. For example, in another communication system, the WBAC 101 is connected to the operator server 104 by using one or more intermediate nodes or the like. In conclusion, at least one embodiment is applied to any suitable communication system, and is not limited to the foregoing example scenario.

To make the objectives, features, and advantages clearer and more comprehensible, the following describes various embodiments with reference to the accompanying drawings by using examples. Clearly, the described embodiments are some but not all of embodiments. Other embodiments obtained by a person of ordinary skill in the art based on the embodiments described herein without creative efforts shall fall within the protection scope of at least one embodiment described herein.

Figure 2:
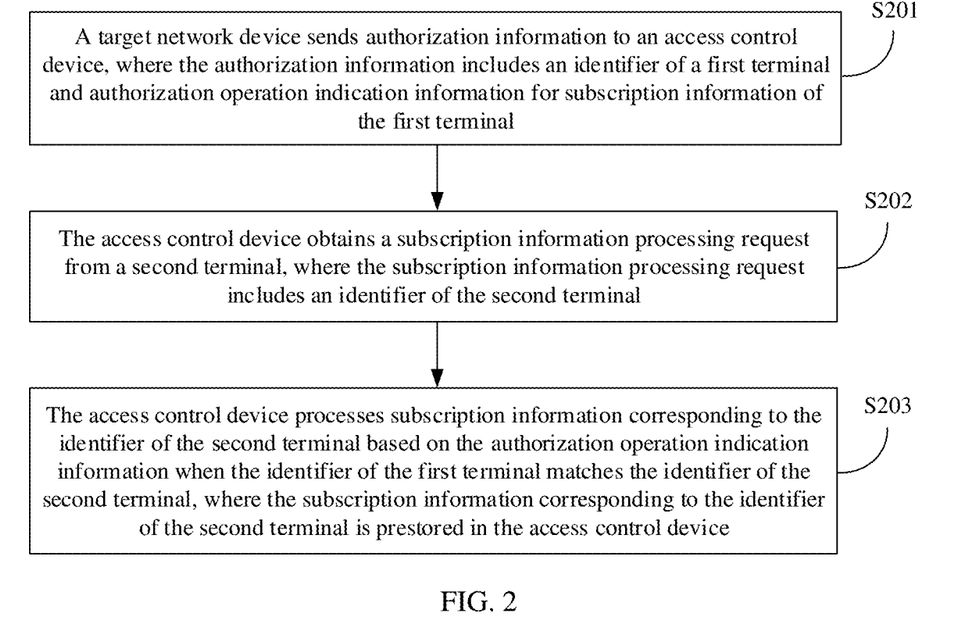
FIG. 2 is a schematic flowchart of a subscription information processing method according to at least one embodiment.

FIG. 2 is a schematic flowchart of a subscription information processing method according to at least one embodiment. The method includes the following steps.

S201: A target network device sends authorization information to an access control device, where the authorization information includes an identifier of a first terminal and authorization operation indication information for subscription information of the first terminal.

In this embodiment, before the access control device processes subscription information of a terminal, the target network device sends authorization information to the access control device. The authorization information is used to notify the access control device that an operation on subscription information of which terminals is legal (that is, is authorized) and notify the access control device of a specific allowed authorization operation on the subscription information. During specific implementation, the authorization information includes the identifier of the first terminal. The identifier of the first terminal is used to notify the access control device that the subscription information of the first terminal corresponding to the identifier is currently allowed to be processed. In addition, the authorization information further includes the authorization operation indication information for the subscription information of the first terminal. The authorization operation indication information is used to notify the access control device of a specific operation that is performed on the subscription information of the terminal. The authorization operation indication information is operation information for the subscription information of the first terminal, for example, information indicating to delete the subscription information or information indicating to update the subscription information. In response to the authorization operation indication information being used to indicate to update the subscription information of the first terminal, the authorization information further includes updated subscription information, so that the access control device updates the subscription information of the first terminal into the subscription information carried in the authorization information. The authorization operation indication information alternatively is mode indication information, for example, a mode indicating to reset the terminal. Different modes of the terminal corresponds to different operations. For example, a reset mode corresponds to a deletion operation on the subscription information, an update mode corresponds to an update operation on the subscription information. Therefore, the access control device determines, based on the mode indication information, an operation performed on the subscription information. Similarly, in response to the authorization operation indication information being the update mode, the authorization information further carries the updated subscription information.

The target network device in this embodiment is a believable legal device, for example, a server of a third-party operator, in other words, the access control device considers by default that information such as instructions sent based on the target network device is legal information. Therefore, a subsequent operation performed by the access control device based on the information is also a legal operation. In at least one embodiment, to ensure legality of the target network device, legality of information sent by the target network device to the access control device is authenticated by, for example, logging in to an account. During specific implementation, a staff member (such as an account opener)

of the third-party operator performs login by using a specific account and password (for example, an administrator account and password). In response to the login succeeding, identity authentication on the staff member succeeds. Therefore, the information delivered by the target network device to the access control device in response to the related operation of the staff member is legal information. In response to the account login of the staff member failing, the target network device refuses to respond to the operation request of the staff member.

The identifier of the first terminal that is sent by the target network device to the access control device is obtained by a staff member by scanning a two-dimensional code of the first terminal by using a related device (for example, obtained by scanning the two-dimensional code by using an application program on the device). The two-dimensional code of the first terminal carries the identifier of the first terminal, for example, an international mobile equipment identity (international mobile equipment identity, IMEI). Certainly, the identifier of the first terminal alternatively is directly input into the related device by a staff member. Then, the related device sends the identifier of the first terminal to the target network device, so that the target network device sends the identifier of the first terminal to the access control device. However, the authorization operation indication information sent by the target network device to the access control device is generated by the related device in response to a specific operation of the staff member and is sent to the target network device.

In at least one embodiment, the authorization information has a validity period (for example, 30 minutes or 1 hour). In response to a duration for which the authorization information is stored in the access control device reaching a preset duration, the authorization information expires. In response to the authorization information expiring, the access control device refuses to process the subscription information of the first terminal.

S202: The access control device obtains a subscription information processing request from a second terminal, where the subscription information processing request includes an identifier of the second terminal.

In response to subscription information of the second terminal being correspondingly processed, the second terminal sends the subscription information processing request to the access control device to request the access control device to process the subscription information of the second terminal. The identifier of the second terminal carried in the subscription information processing request is used to indicate subscription information of which terminal is to be processed by the access control device.

S203: The access control device processes subscription information corresponding to the identifier of the second terminal based on the authorization operation indication information in response to the identifier of the first terminal matching the identifier of the second terminal, where the subscription information corresponding to the identifier of the second terminal is prestored in the access control device.

In this embodiment, after receiving the authorization information sent by the target network device and the subscription information processing request sent by the second terminal, the access control device first determines whether the second terminal requesting the access control device to process the subscription information and the first terminal for which processing on the subscription information has been authorized are a same terminal. During specific implementation, whether the identifier of the first terminal is the same as the identifier of the second terminal is determined. In response to the identifier of the first terminal being the same as the identifier of the second terminal, the identifier indicates that the second terminal has been authorized in advance and the subscription information of the second terminal is allowed to be processed. In this case, the access control device processes the subscription information of the second terminal based on the authorization operation indication information from the target network device, that is, process the subscription information corresponding to the identifier of the second terminal. However, in response to the identifier of the first terminal being different from the identifier of the second terminal, the second terminal has not obtained authorization of processing the subscription information. In this case, the access control device refuses to process the subscription information of the second terminal. The identifier of the second terminal and the subscription information of the second terminal is correspondingly prestored in the access control device. For example, before the second terminal initially accesses a network, the target network device registers the subscription information of the second terminal, and the access control device stores the identifier of the second terminal and the subscription information corresponding to the identifier of the second terminal, so that the subscription information of the second terminal is processed subsequently.

In this embodiment, the subscription information of the second terminal is quality of service (quality of service, QoS) of the second terminal and/or a group ID (identity), and certainly, is other information. This is not limited in this embodiment.

The authorization information stored in the access control device has a validity period. In this case, the access control device processes the subscription information of the second terminal based on the operation indication information in response to the access control device determining that the identifier of the first terminal is consistent with the identifier of the second terminal and duration for which the authorization information has been received not exceeding effective duration of the authorization information. However, in response to the effective duration of the authorization information expiring, the subscription information of the first terminal does not have a right to be processed. In this case, even in response to the second terminal that is the same terminal as the first terminal requesting the access control device to process the subscription information again, the access control device refuses to process the subscription information of the second terminal.

In at least one embodiment, in response to receiving the subscription information processing request of the second terminal, the access control device further performs identity authentication on the second terminal. Moreover, the access control device processes the subscription information of the second terminal after the identity authentication on the second terminal succeeds. In this case, the access control device processes the subscription information corresponding to the identifier of the second terminal when the identifier of the first terminal is determined to be the same as the identifier of the second terminal and the identity authentication on the second terminal succeeds.

In an example of authenticating the identity of the second terminal, the second terminal establishes, by using a preconfigured certificate, a secure connection to the access control device based on a protocol such as a hyper text transfer protocol over secure socket layer (hyper text transfer protocol over secure socket layer, HTTPS). The connection is an indirect connection implemented between the second terminal and the access control device through an access point. In at least one embodiment, the connection alternatively is a direct connection between the second terminal and the access control device (that is, an independently configured direct path existing between the second terminal and the access control device). Next, the second terminal sends, to the access control device based on the established secure connection, the identifier of the second terminal and a first random number generated by the second terminal. The access control device determines, based on the identifier of the second terminal, a first key value corresponding to the identifier of the second terminal. The first key value is determined by pre-negotiating with the second terminal. The access control device stores the first key value, and the second terminal stores a same key value (which is referred to as a second key value below for ease of description). Subsequently, the access control device calculates a first challenge value based on the first key value and the first random number. In addition, the access control device further generates a second random number, and send the first challenge value and the second random number to the second terminal. The second terminal verifies the received first challenge value by using the second key value and the first random number that are stored in the second terminal, and obtains a value through calculation based on the second key value and the first random number, and compare the value with the first challenge value. In response to the two values being the same, the verification on the first challenge value succeeds, that is, authentication performed by the second terminal on the network succeeds. In response to the two values being different, the verification on the first challenge value fails. After the verification on the first challenge value succeeds, the second terminal calculates a second challenge value based on the second key value and the second random number, and send the second challenge value to the access control device. The access control device verifies the second challenge value by using the first key value and the second random number, obtains a value through calculation based on the first key value and the second random number, and compare the value with the second challenge value. In response to the value being consistent with the second challenge value, the authentication performed by the access control device on the second terminal succeeds. In response to the two values being different, the authentication on the second terminal fails.

In the foregoing embodiment, an example in which the second terminal and the access control device perform two-way authentication is used to describe the authentication process. In at least one embodiment, the access control device alternatively performs one-way authentication on the second terminal. For example, the second terminal generates a challenge value by using the second key value and the first random number that are stored in the second terminal, and send the challenge value and the first random number to the access control device. The access control device obtains a value through calculation by using the first key value (which is determined based on the identifier of the second terminal) stored in the access control device and the received first random number, and compare the value with the received challenge value. In response to the two values being the same, the authentication performed by the access control device on the second terminal succeeds. In response to the two values being different, the authentication on the second terminal fails.

Further, after the access control device finishes processing the subscription information of the second terminal, the access control device deletes the authorization information obtained from the target network device. In this way, an illegal user using the second terminal is prevented from illegally operating the subscription information of the second terminal. The access control device alternatively deletes the temporarily stored authorization information in response to the validity period of the authorization information expiring.

In this embodiment, before processing subscription information of a terminal, the access control device obtains the authorization information from the target network device, where the authorization information includes the identifier of the first terminal and the authorization operation indication information for the subscription information of the first terminal. In this way, the access control device determines that the subscription information of the first terminal is allowed to be correspondingly processed currently based on the authorization information. Then, the access control device obtains the subscription information processing request from the second terminal, where the processing request includes the identifier of the second terminal. Next, in response to the identifier of the second terminal in the subscription information processing request matching the identifier of the first terminal in the authorization information, the identifier indicates that the first terminal and the second terminal are a same terminal. Therefore, a processing operation performed by the access control device on the subscription information of the second terminal is a legal operation. In this case, the access control device processes, based on the authorization operation indication information, the subscription information corresponding to the identifier of the second terminal, where the subscription information corresponding to the identifier of the second terminal is prestored in the access control device. In at least one embodiment, the access control device correspondingly processes the subscription information of the second terminal in response to the target network device providing the authorization information. In this way, even in response to a terminal being illegally stolen and unilaterally requesting the access control device to process subscription information of the terminal, because a current operator of the terminal cannot trigger the target network device to send the subscription information of the terminal to the access control device, the access control device does not process, based on a unilateral request of the terminal, the subscription information corresponding to the terminal, so that legality of processing the subscription information of the terminal is improved.

Figure 3A:
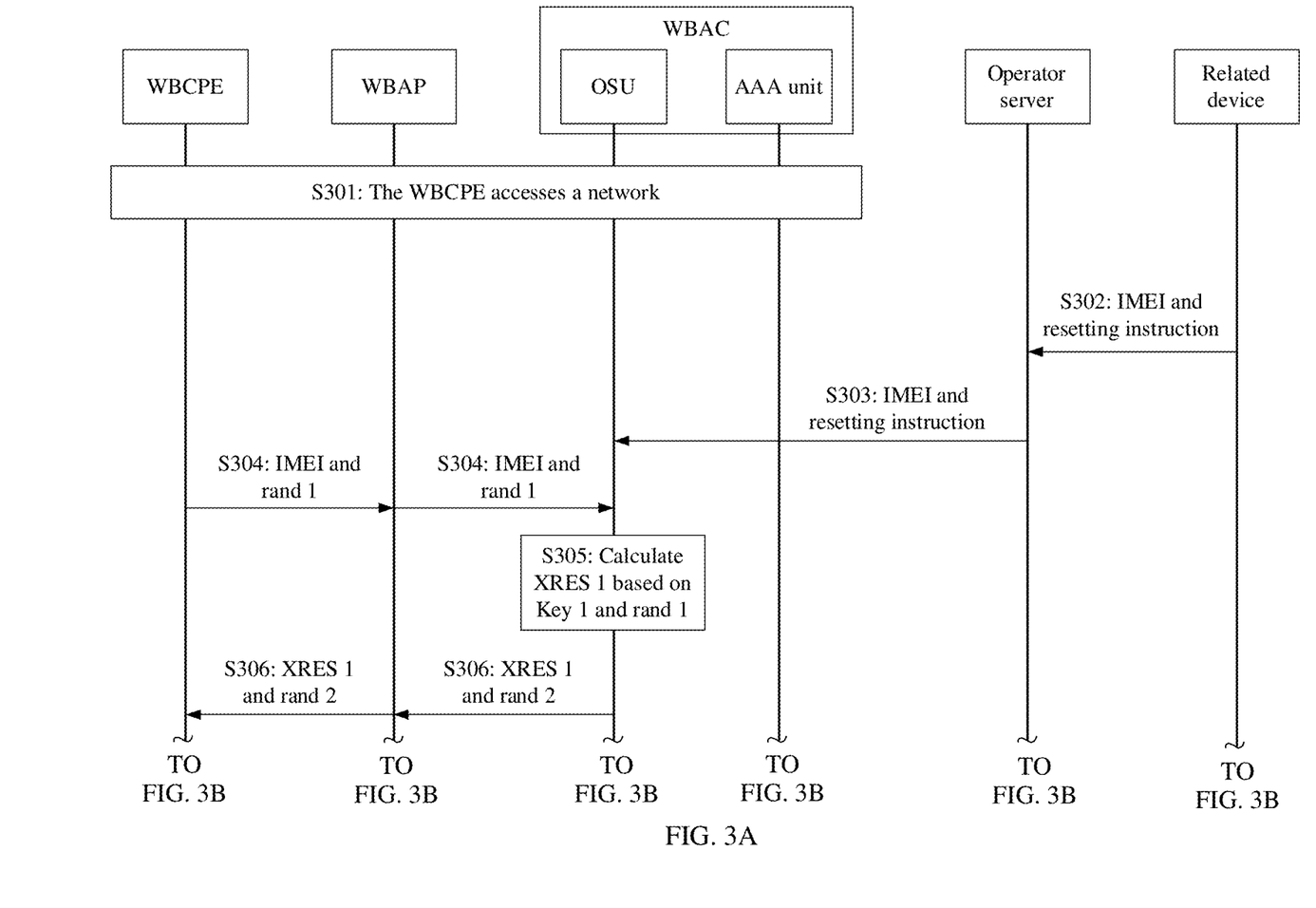
FIG. 3A and FIG. 3B are a schematic diagram of signaling exchanges of a subscription information processing method illustrated with reference to an example scenario according to at least one embodiment.
Figure 3B:
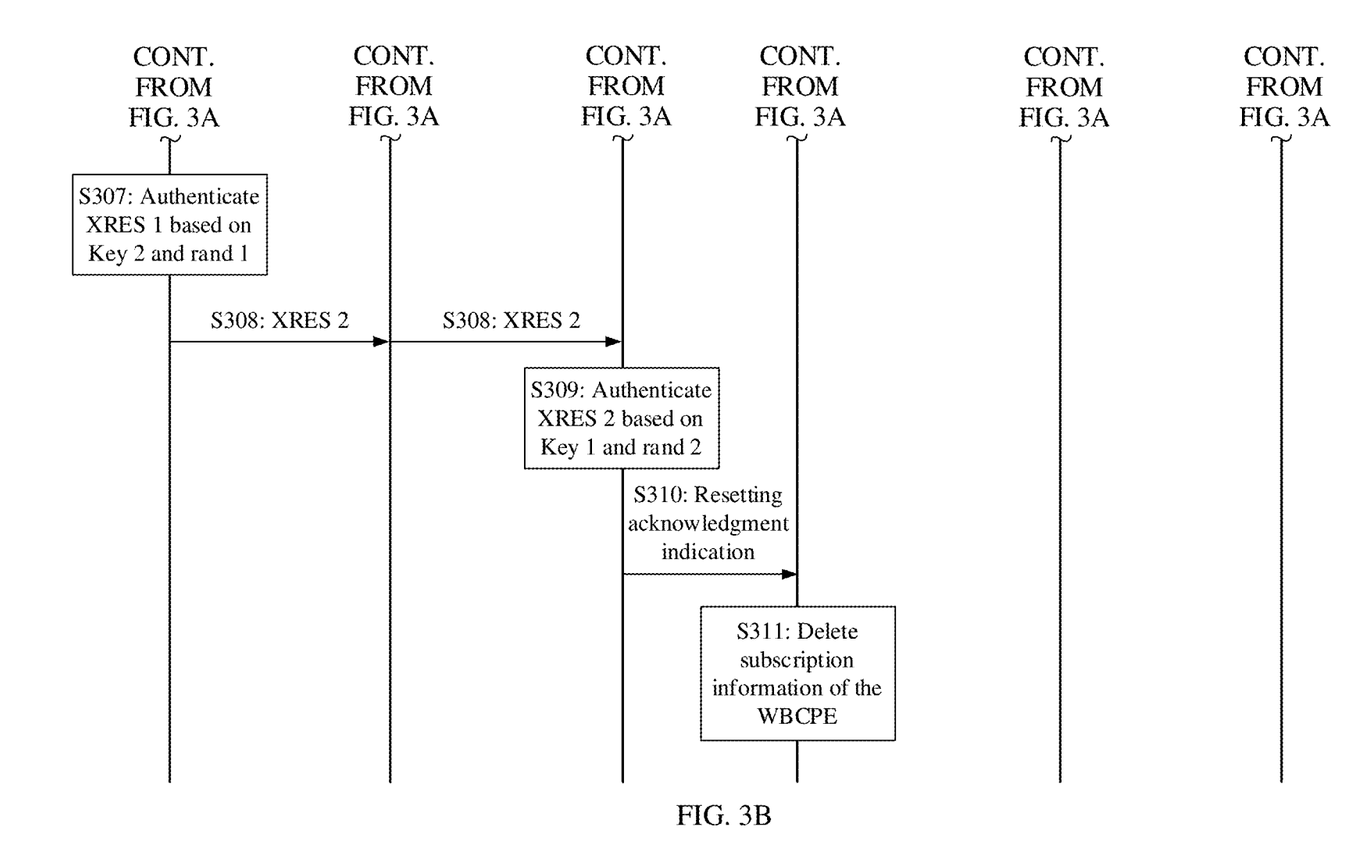

For ease of understanding the technical solution, the following describes the technical solution of embodiments in detail with reference to a specific scenario of resetting WBCPE. FIG. 3A and FIG. 3B are a schematic diagram of signaling exchanges of a subscription information processing method according to at least one embodiment. In the following scenario embodiment, WBCPE (the second terminal in the foregoing method embodiment) requests a WBAC (the access control device in the foregoing method embodiment) to delete subscription information of the WBCPE. The method includes the following steps.

S301: The WBCPE accesses a network to connect to a WBAP.

S302: A related device obtains IMEI information of the WBCPE, and sends the IMEI information and a resetting instruction to an operator server in response to successfully logging in to a specific account.

In at least one embodiment, a staff member manually enters the IMEI information of the WBCPE on the related device; or scans, by using an application on the related device, a two-dimensional code, carrying the IMEI information, on the WBCPE to obtain the IMEI information of the WBCPE. In addition, in response to the staff member adjusting an operating menu on the related device to a resetting mode, the related device generates a corresponding resetting instruction. In response to the staff member successfully logging in to a specific account, an identity of the staff member is legal and an operation triggered by the staff member by using the related device is also legal. Therefore, the related device sends the operation and the IMEI information to the operator server together.

S303: The operator server forwards the received IMEI information of the WBCPE and the received resetting instruction to the WBAC.

S304: The WBCPE sends the IMEI information of the WBCPE and a random number rand 1 to the WBAC through the WBAP, where rand 1 is generated by the WBCPE.

In this embodiment, the WBCPE establishes a secure connection to an OSU in the WBAC by using a preconfigured certificate and an HTTPS protocol. In this way, the WBCPE communicates with the WBAC through the WBAP. Next, the WBCPE generates the random number rand 1 by using a random algorithm, and send rand 1 and the IMEI information of the WBCPE to the WBAC together through the established secure connection.

S305: The OSU in the WBAC obtains a prestored key value Key 1 based on the IMEI information, and calculates an expected challenge value XRES 1 based on Key 1 and received rand 1.

In this embodiment, the WBAC correspondingly prestores the IMEI information of the WBCPE and the key value Key 1. For example, the WBAC assigns Key 1 to the WBCPE in response to the WBCPE initially accessing the network, and correspondingly storing Key 1 and the IMEI information of the WBCPE.

The WBAC includes an online signing unit (online signing unit, OSU) and an authentication, authorization, and accounting (authentication, authorization, and accounting, AAA) unit. The OSU performs operations such as communicating with and authenticating another device, and the AAA unit performs operations such as processing subscription information.

S306: The OSU in the WBAC generates a random number rand 2, and sends rand 2 and XRES 1 to the WBCPE through the WBAP.

S307: The WBCPE authenticates received XRES 1 based on Key 2 stored in the WBCPE and rand 1.

During specific implementation, the WBCPE calculates a response value RES 1 based on Key 2 and rand 1, and compare RES 1 with received XRES 1. If RES 1 is the same as XRES 1, authentication performed by the WBCPE on XRES 1 succeeds, that is, authentication performed by the WBCPE on an access network succeeds. Certainly, if RES 1 is different from XRES 1, the authentication on XRES 1 fails. Correspondingly, the WBCPE stops performing a subsequent step. Further, in response to the authentication on XRES 1 failing, the WBCPE reports an error and so on.

S308: In response to the authentication on XRES 1 succeeding, the WBCPE calculates an expected challenge value XRES 2 based on Key 2 and received rand 2, and sends XRES 2 to the OSU in the WBAC.

S309: The OSU in the WBAC authenticates XRES 2 based on Key 1 and rand 2.

During specific implementation, the OSU calculates a response value RES 2 based on Key 1 and rand 2, and compare RES 2 with received XRES 2. If RES 2 is the same as XRES 2, authentication performed by the OSU on XRES 2 succeeds, that is, authentication performed by the OSU on the WBCPE succeeds.

S310: in response to the authentication on XRES 2 succeeding, the OSU delivers a resetting acknowledgment indication to the AAA unit based on the received resetting instruction.

S311: The AAA unit deletes the subscription information of the WBCPE based on the resetting acknowledgment indication.

Further, the AAA unit further deletes the related credential information used by the WBCPE to access the network.

Figure 4A:
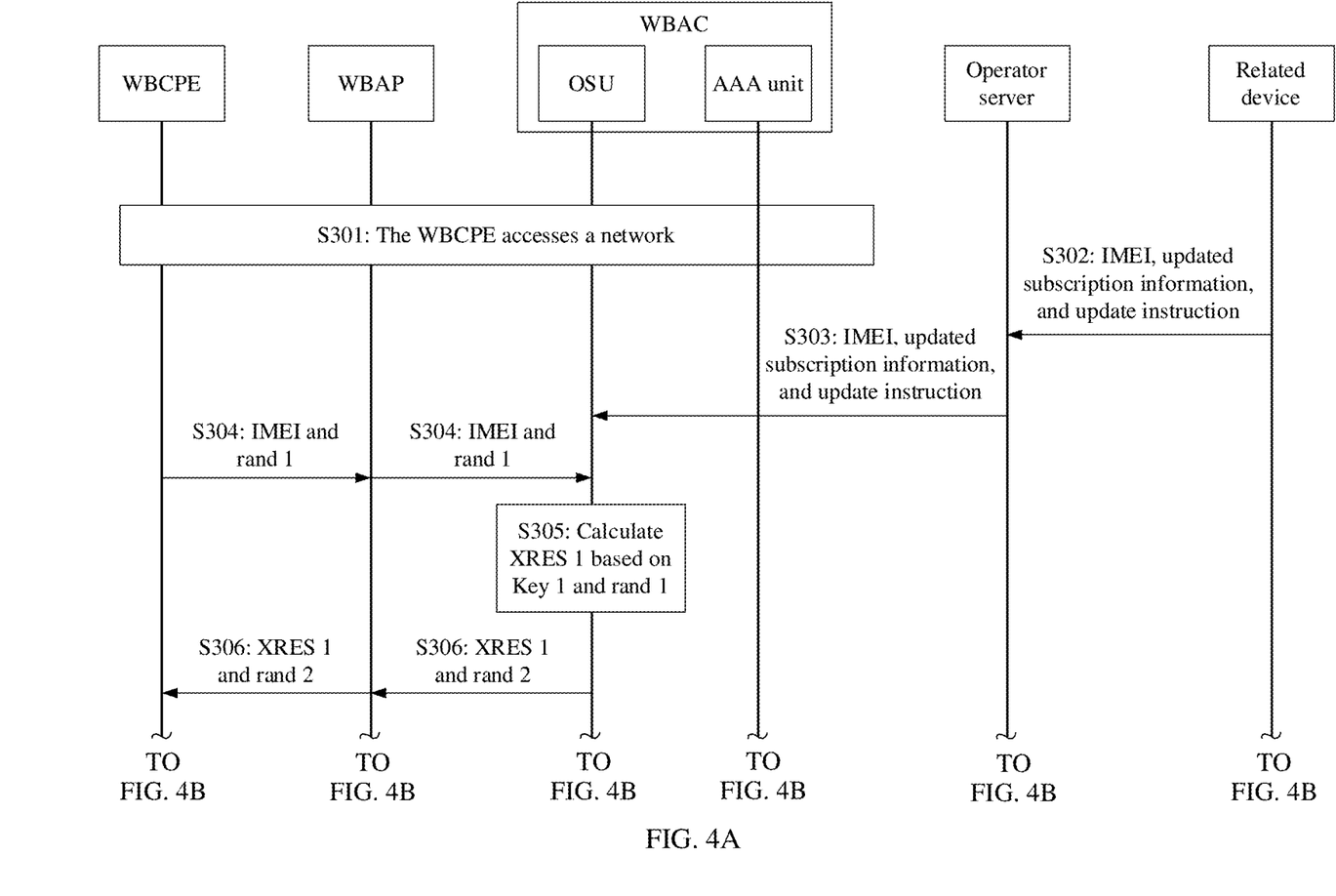
FIG. 4A and FIG. 4B are a schematic diagram of signaling exchanges of a subscription information processing method illustrated with reference to another example scenario according to at least one embodiment.
Figure 4B:
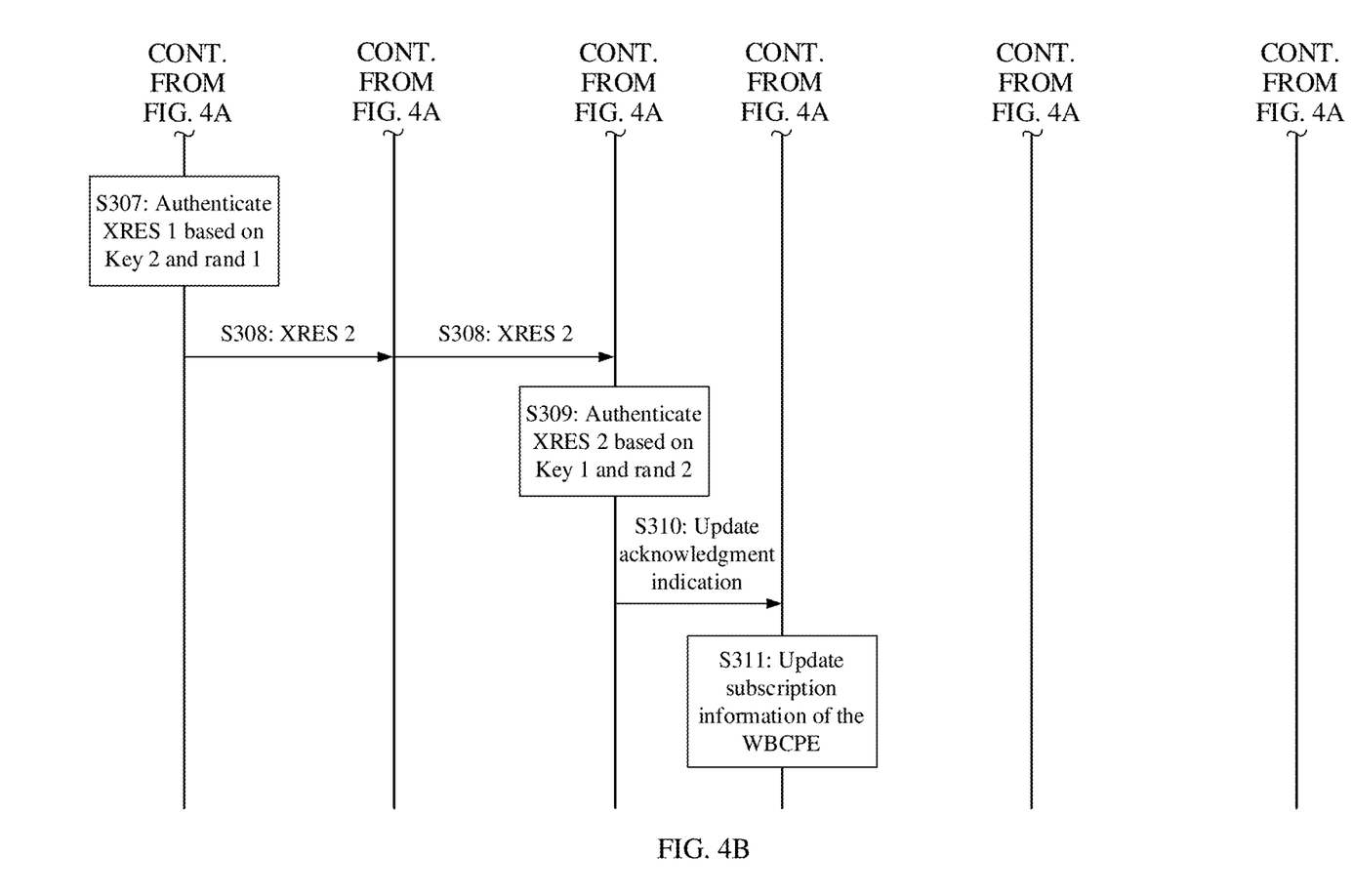

In the foregoing scenario embodiment, the example in which the subscription information is deleted is used for example description. In another scenario embodiment, the subscription information alternatively is updated. FIG. 4A and FIG. 4B are a schematic diagram of signaling exchanges of another subscription information processing method. In the following scenario embodiment, WBCPE requests a WBAC to update subscription information of the WBCPE. The method includes the following steps.

S401: The WBCPE accesses a network to connect to a WBAP.

S402: A related device obtains IMEI information of the WBCPE, and sends the IMEI information, updated subscription information, and an update instruction to an operator server in response to successfully logging in to a specific account.

Different from the foregoing embodiment, in this embodiment, the subscription information of the WBCPE is updated. Therefore, the related device sends the updated subscription information together with the IMEI information and the update instruction to the operator server, so that the operator server subsequently forwards the information to the WBAC.

S403: The operator server forwards the received IMEI information, the received updated subscription information, and the received resetting instruction to the WBAC.

S404: The WBCPE sends the IMEI information of the WBCPE and a random number rand 1 to the WBAC through the WBAP, where rand 1 is generated by the WBCPE.

S405: An OSU in the WBAC obtains a prestored key value Key 1 based on the IMEI information, and calculates an expected challenge value XRES 1 based on Key 1 and received rand 1.

S406: The OSU in the WBAC generates a random number rand 2, and sends rand 2 and XRES 1 to the WBCPE through the WBAP.

S407: The WBCPE authenticates received XRES 1 based on Key 2 stored in the WBCPE and rand 1.

S408: In response to the authentication on XRES 1 succeeding, the WBCPE calculates an expected challenge value XRES 2 based on Key 2 and received rand 2, and sends XRES 2 to the OSU in the WBAC.

S409: The OSU in the WBAC authenticates XRES 2 based on Key 1 and rand 2.

In this embodiment, specific implementations of step S401 to step S409 are similar to the specific implementations of step S301 to step S309 in the foregoing embodiment. For details, refer to the description of the foregoing related part. Details are not described herein again.

S410: In response to the authentication on XRES 2 succeeding, the OSU delivers an update acknowledgment indication to an AAA unit based on the received update instruction.

S411: The AAA unit updates the existing subscription information based on the update acknowledgment indication by using the received updated subscription information.

Figure 5:
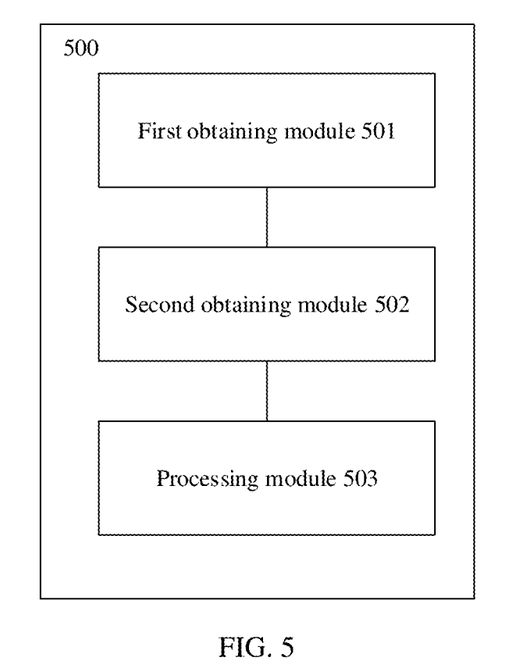
FIG. 5 is a schematic diagram of a structure of a subscription information processing apparatus according to at least one embodiment.
Figure 6:
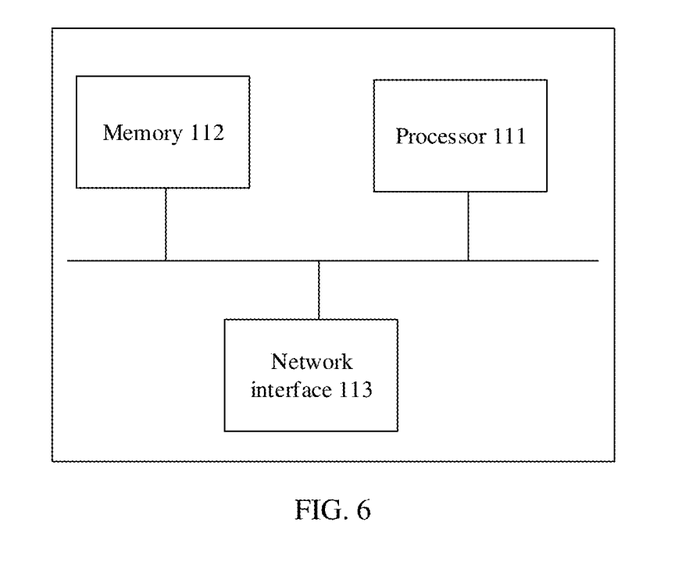
FIG. 6 is a schematic diagram of a hardware structure of a device according to at least one embodiment.

According to a second aspect, at least one embodiment further provides a subscription information processing apparatus. FIG. 5 is a schematic diagram of a structure of a subscription information processing apparatus according to at least one embodiment. The apparatus 500 is applied to an access control device. The apparatus 500 includes:

- a first obtaining module 501, configured to obtain authorization information from a target network device, where the authorization information includes an identifier of a first terminal and authorization operation indication information for subscription information of the first terminal;
- a second obtaining module 502, configured to obtain a processing request from an access network device, where the processing request includes an identifier of the second terminal; and
- a processing module 503, configured to process subscription information corresponding to the identifier of the second terminal based on the authorization operation indication information in response to the identifier of the first terminal matching the identifier of the second terminal, where the subscription information corresponding to the identifier of the second terminal is prestored in the access controller.

In at least one embodiment, the apparatus 500 further includes:

- an authentication module, configured to perform identity authentication on the second terminal.

The processing module 503 is configured to process the subscription information corresponding to the identifier of the second terminal based on the operation indication information in response to the identifier of the first terminal matching the identifier of the second terminal and the identity authentication on the second terminal succeeding.

In at least one embodiment, the authentication module includes:

- a sending unit, configured to send a first challenge value and a second random number to the second terminal, where the first challenge value is calculated by the access controller based on a first key value and a first random number that is from the second terminal, and the first key value is determined by the access controller based on the identifier of the second terminal;
- a calculation unit, configured to calculate a response value based on the first key value and the second random number; and
- a determining unit, configured to: in response to the response value being the same as a second challenge value from the second terminal, determine that the identity authentication on the second terminal succeeds, where the second challenge value is calculated based on a second key value on the second terminal and the second random number.

In at least one embodiment, the processing module 503 is configured to process the subscription information corresponding to the identifier of the second terminal based on the operation indication information in response to the identifier of the first terminal matching the identifier of the second terminal and duration of receiving the authorization information by the access controller not exceeding effective duration of the authorization information.

In at least one embodiment, the authorization operation indication information is used to indicate to delete or update the subscription information of the first terminal.

In at least one embodiment, in response to the authorization operation indication information being used to indicate to update the subscription information of the first terminal, the authorization information further includes updated subscription information.

In at least one embodiment, the apparatus 500 further includes:

- a deletion module, configured to: in response to the access controller finishing processing the subscription information corresponding to the identifier of the second terminal based on the authorization operation indication information, delete the authorization information obtained from the target network device.

Content such as information exchange and an execution process between the modules/units of the foregoing apparatus is based on a same conception as at least one embodiment of the method, and brings a technical effect the same as that of at least one embodiment of the method. For specific content, refer to the descriptions in at least one embodiment of the method shown above. Details are not described herein again.

In addition, at least one embodiment further provides a device. The device is applied to the access control device mentioned in the at least one embodiment of the method described herein.

The device includes a processor. The processor is coupled to a memory.

The memory is configured to store a computer program or instructions.

The processor is configured to execute the computer program and instructions, so that the access control device in the foregoing method embodiments performs the subscription information processing method.

FIG. 5 is a schematic diagram of a hardware structure of a device. The device is applied to the access control device in the embodiments of this application. The device includes at least one processor 111, at least one memory 112, and at least one network interface 113. The processor 111 and the memory 112 are connected to the network interface 113 through, for example, a bus. In at least one embodiment, the connection includes various types of interfaces, transmission lines, buses, or the like. The connection is not limited. The network interface 113 is configured to enable the device to connect to another communication device through a communication link.

In FIG. 5, the processor 111 completes the processing action of the access control device in the foregoing method, the memory 112 completes the storing action in the foregoing method, and the network interface 113 completes the action of interacting with another device in the foregoing method. The following uses an example in which the device shown in FIG. 5 is an access control device for example description.

The processor 111 processes subscription information corresponding to an identifier of a second terminal based on authorization operation indication information in response to an identifier of a first terminal matching the identifier of the second terminal, where the subscription information corresponding to the identifier of the second terminal is prestored in an access control device. The network interface 113 obtains authorization information from a target network device and a subscription information processing request from the second terminal, where the authorization information includes the identifier of the first terminal and authorization operation indication information for subscription information of the first terminal, and the subscription information processing request includes the identifier of the second terminal. The memory 112 stores the authorization information, the subscription information processing request, and the like.

In at least one embodiment, the processor 111 further performs identity authentication on the second terminal, and processes the subscription information corresponding to the identifier of the second terminal based on the operation indication information in response to the identifier of the first terminal matching the identifier of the second terminal and the identity authentication on the second terminal succeeding.

In at least one embodiment, the processor 111 sends a first challenge value and a second random number to the second terminal, where the first challenge value is calculated by the access control device based on a first key value and a first random number that is from the second terminal, and the first key value is determined by the access control device based on the identifier of the second terminal; the access control device calculates a response value based on the first key value and the second random number; and in response to the response value being the same as a second challenge value from the second terminal, the access control device determines that the identity authentication on the second terminal succeeds, where the second challenge value is calculated based on a second key value on the second terminal and the second random number.

In at least one embodiment, the processor 111 processes the subscription information corresponding to the identifier of the second terminal based on the operation indication information in response to the identifier of the first terminal matching the identifier of the second terminal and duration of receiving the authorization information by the access control device not exceeding effective duration of the authorization information.

In at least one embodiment, the authorization operation indication information is used to indicate to delete or update the subscription information of the first terminal.

In at least one embodiment, in response to the authorization operation indication information being used to indicate to update the subscription information of the first terminal, the authorization information further includes updated subscription information.

In at least one embodiment, in response to the access control device finishing processing the subscription information corresponding to the identifier of the second terminal based on the authorization operation indication information, the processor 111 deletes the authorization information obtained from the target network device.

The processor, for example, the processor 111 includes but is not limited to at least one of the following: a central processing unit (central processing unit, CPU), a microprocessor, a digital signal processor (DSP), a microcontroller unit (microcontroller unit, MCU), or various types of computing devices, such as an artificial intelligence processor, that run software, where a computing device includes one or more cores configured to execute software instructions to perform an operation or perform processing. The processor is an independent semiconductor chip, or is integrated with another circuit to form a semiconductor chip. For example, the processor and another circuit (for example, an encoding/decoding circuit, a hardware acceleration circuit, or various buses and interface circuits) forms an SoC (system-on-a-chip). Alternatively, the processor is integrated into an ASIC as a built-in processor of the ASIC, and the ASIC integrated with the processor is independently packaged or is packaged with another circuit. In addition to the core configured to execute software instructions to perform an operation or perform processing, the processor further includes a necessary hardware accelerator, for example, a field programmable gate array (field programmable gate array, FPGA), a PLD (programmable logic device), or a logic circuit that implements a dedicated logic operation.

The memory in at least one embodiment includes at least one of the following: a read-only memory (read-only memory, ROM) or another type of static storage device that stores static information and instructions, or a random access memory (random access memory, RAM) or another type of dynamic storage device that stores information and instructions, or is an electrically erasable programmable read-only memory (Electrically erasable programmable read-only memory, EEPROM). In some scenarios, the memory alternatively is a compact disc read-only memory (compact disc read-only memory, CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that is configured to carry or store expected program code in an instruction form or a data structure form and that is accessed by a computer. However, the memory is not limited thereto.

In at least one embodiment, memory 112 exists independently, and is connected to the processor 111. Optionally, the memory 112 and the processor 111 is integrated together, for example, integrated in a chip. The memory 112 stores program code for performing the technical solutions according to embodiments described herein, and the processor 111 controls execution of the program code. Various types of executed computer program code are drivers of the processor 111. For example, the processor 111 is configured to execute the computer program code stored in the memory 112, to implement the technical solutions according to embodiments described herein.

In the foregoing embodiments, the instructions that are stored in the memory and that are to be executed by the processor is implemented in a form of a computer program product. The computer program product is written in the memory in advance, or is downloaded and installed in the memory in a form of software.

The computer program product includes one or more computer instructions. In response to the computer program instructions being loaded and executed on a computer, procedures or functions according to at least one embodiment are completely or partially generated. The computer is a general-purpose computer, a dedicated computer, a computer network, or another programmable apparatus. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid state disk, SSD)), or the like.

At least one embodiment further provides a computer-readable storage medium. The method described in the foregoing embodiment is completely or partially implemented by using software, hardware, firmware, or any combination thereof. If the method is implemented in software, the functions used as one or more instructions or code is stored or transmitted on the computer-readable medium. The computer-readable medium includes a computer storage medium and a communication medium, and further includes any medium that transfers a computer program from one place to another. The storage medium is any target medium that is accessed by a computer.

In at least one embodiment, the computer-readable medium includes a RAM, a ROM, an EEPROM, a CD-ROM or other optical disc storage, magnetic disk storage or another magnetic storage device, or any other medium that is used to carry or store program code in an instruction form or a data structure form and that is accessed by a computer. In addition, any connection is properly referred to as a computer-readable medium. For example, in response to a coaxial cable, an optical fiber cable, a twisted pair, a digital subscriber line (DSL), or a wireless technology (for example, infrared, radio, or microwave) being used to transmit software from a website, a server, or another remote source, the coaxial cable, the optical fiber cable, the twisted pair, the DSL, or the wireless technology, for example, infrared, radio, or microwave, is included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data by using laser light. The foregoing combination is included within the scope of the computer-readable medium.

As described herein, "of (English: of)", "corresponding (English: corresponding, relevant)", and "corresponding (English corresponding)" is interchangeably used sometimes. Expressed meanings are consistent when differences are not emphasized.

The term such as "example" or "for example" is used to represent giving an example, an illustration, or a description. Any embodiment described as an "example" or "for example" in at least one embodiment is not meant as being more preferred or having more advantages than another embodiment described herein. Use of the term such as "example" or "for example" is intended to present a related concept.

In at least one embodiment, "at least one" means one or more. "A plurality of" means two or more. The term "and/or" describes an association relationship between associated objects and represents that three relationships exist. For example, A and/or B represent the following cases: Only A exists, both A and B exist, and only B exists, where A and B is in a singular or plural form. The character "/" generally indicates an "or" relationship between the associated objects. "At least one of the following items (pieces)" or a similar expression thereof refers to any combination of these items, including any combination of singular items (pieces) or plural items (pieces). For example, at least one of A, B, or C indicates A, B, C, A and B, A and C, B and C, or A, B, and C, or A, B, and C, where A, B, and C is singular or plural. In addition, to clearly describe technical solutions in embodiments described herein, terms such as "first" and "second" are used to identify same items or similar items that have basically same functions and purposes. A person skilled in the art will understand that the terms such as "first" and "second" do not limit a quantity and an execution sequence, and the terms such as "first" and "second" do not indicate a difference.

A person skilled in the art clearly understands that some or all steps of the methods in at least one embodiment is implemented by using a combination of software and a universal hardware platform. Based on such an understanding, the technical solutions of at least one embodiment is implemented in a form of a software product. The computer software product is stored in a storage medium, for example, a read-only memory (English: read-only memory, ROM)/RAM, a magnetic disk, or a compact disc, and includes several instructions for instructing a computer device (which is a personal computer, a server, or a network communication device such as a router) to perform methods described in at least one embodiment.

The embodiments in this specification are described in a progressive manner, for same or similar parts in the embodiments, refer to these embodiments, and differences between one or more embodiments. Especially, an apparatus embodiment is basically similar to a method embodiment, and therefore is described briefly. For related parts, refer to partial descriptions in the method embodiment. The described apparatus embodiment is merely an example. The modules described as separate parts are or are not physically separate, and parts displayed as modules are or are not physical modules, are located in one place, or are distributed on a plurality of network units. Some or all of the modules are selected to achieve the objectives of the solutions of the embodiments. A person of ordinary skill in the art will understand and implement embodiments described herein without creative efforts.

The foregoing descriptions are examples of at least one embodiment, but are not intended to limit the protection scope embodiments described herein.

What is claimed is:

1. A subscription information processing method, wherein the method comprises:
    obtaining, by an access control device, authorization information from a target network device, wherein the authorization information comprises an identifier of a first terminal and authorization operation indication information for subscription information of the first terminal;
    obtaining, by the access control device, a subscription information processing request from a second terminal, wherein the subscription information processing request comprises an identifier of the second terminal;
    processing, by the access control device, subscription information corresponding to the identifier of the second terminal based on the authorization operation indication information in response to the identifier of the first terminal matching the identifier of the second terminal, wherein the subscription information corresponding to the identifier of the second terminal is prestored in the access control device, the identifier of the first terminal matching the identifier of the second terminal indicating the first terminal and the second terminal are the same; and
    performing, by the access control device, identity authentication on the second terminal, wherein the performing identity authentication on the second terminal comprises:
        sending, by the access control device, a first challenge value and a second random number to the second terminal, wherein the first challenge value is calculated by the access control device based on a first key value and a first random number that is from the second terminal, and the first key value is determined by the access control device based on the identifier of the second terminal.

2. The method according to claim 1, wherein
the processing, by the access control device, subscription information corresponding to the identifier of the second terminal based on the operation indication information in response to the identifier of the first terminal matching the identifier of the second terminal includes:
processing, by the access control device, the subscription information corresponding to the identifier of the second terminal based on the operation indication information in response to the identifier of the first terminal matching the identifier of the second terminal and the identity authentication on the second terminal succeeding.

3. The method according to claim 2, wherein the performing, by the access control device, identity authentication on the second terminal further comprises:
calculating, by the access control device, a response value based on the first key value and the second random number; and
in response to the response value being a same as a second challenge value from the second terminal, determining, by the access control device, that the identity authentication on the second terminal succeeds, wherein the second challenge value is calculated based on a second key value on the second terminal and the second random number.

4. The method according to claim 1, wherein the processing, by the access control device, subscription information corresponding to the identifier of the second terminal based on the operation indication information in response to the identifier of the first terminal matching the identifier of the second terminal includes:
processing, by the access control device, the subscription information corresponding to the identifier of the second terminal based on the operation indication information in response to the identifier of the first terminal matching the identifier of the second terminal and duration of receiving the authorization information by the access control device not exceeding effective duration of the authorization information.

5. The method according to claim 1, wherein the authorization operation indication information is used to indicate to delete or update the subscription information of the first terminal.

6. The method according to claim 5, wherein in response to the authorization operation indication information being used to indicate to update the subscription information of the first terminal, the authorization information further comprises updated subscription information.

7. The method according to claim 1, wherein the method further comprises:
in response to the access control device finishing processing the subscription information corresponding to the identifier of the second terminal based on the authorization operation indication information, deleting, by the access control device, the authorization information obtained from the target network device.

8. An access control device, comprising:
a processor; and
a memory coupled to the processor, the memory comprising instructions that, in response to being executed by the processor, cause the access control device to perform a method comprising:
obtaining, authorization information from a target network device, wherein the authorization information comprises an identifier of a first terminal and authorization operation indication information for subscription information of the first terminal;
obtaining, a subscription information processing request from a second terminal, wherein the subscription information processing request comprises an identifier of the second terminal; and
processing, subscription information corresponding to the identifier of the second terminal based on the authorization operation indication information in response to the identifier of the first terminal matching the identifier of the second terminal, wherein the subscription information corresponding to the identifier of the second terminal is prestored in the access control device, the identifier of the first terminal matching the identifier of the second terminal indicating the first terminal and the second terminal are the same; and
performing, identity authentication on the second terminal, wherein the performing, identity authentication on the second terminal comprises:
sending, a first challenge value and a second random number to the second terminal, wherein the first challenge value is calculated by the access control device based on a first key value and a first random number that is from the second terminal, and the first key value is determined by the access control device based on the identifier of the second terminal.

9. The access control device according to claim 8, wherein
the processing, subscription information corresponding to the identifier of the second terminal based on the operation indication information in response to the identifier of the first terminal matching the identifier of the second terminal includes:
processing, the subscription information corresponding to the identifier of the second terminal based on the operation indication information in response to the identifier of the first terminal matching the identifier of the second terminal and the identity authentication on the second terminal succeeding.

10. The access control device according to claim 9, wherein the performing, identity authentication on the second terminal further comprises:
calculating, a response value based on the first key value and the second random number; and
in response to the response value being a same as a second challenge value from the second terminal, determining, that the identity authentication on the second terminal succeeds, wherein the second challenge value is calculated based on a second key value on the second terminal and the second random number.

11. The access control device according to claim 8, wherein the processing, subscription information corresponding to the identifier of the second terminal based on the operation indication information in response to the identifier of the first terminal matching the identifier of the second terminal includes:
processing, the subscription information corresponding to the identifier of the second terminal based on the operation indication information in response to the identifier of the first terminal matching the identifier of the second terminal and duration of receiving the authorization information not exceeding effective duration of the authorization information.

12. The access control device according to claim 8, wherein the authorization operation indication information is used to indicate to delete or update the subscription information of the first terminal.

13. The access control device according to claim 12, wherein in response to the authorization operation indication information being used to indicate to update the subscription information of the first terminal, the authorization information further comprises updated subscription information.

14. The access control device according to claim 8, wherein the method further comprises:
   in response to the access control device finishing processing the subscription information corresponding to the identifier of the second terminal based on the authorization operation indication information, deleting the authorization information obtained from the target network device.

15. A non-transitory computer-readable storage medium having computer-readable instructions stored thereon, wherein in response to the computer-readable instructions being executed by a processor causes the processor to perform a method comprising:
   obtaining, by an access control device, authorization information from a target network device, wherein the authorization information comprises an identifier of a first terminal and authorization operation indication information for subscription information of the first terminal;
   obtaining, by the access control device, a subscription information processing request from a second terminal, wherein the subscription information processing request comprises an identifier of the second terminal;
   processing, by the access control device, subscription information corresponding to the identifier of the second terminal based on the authorization operation indication information in response to the identifier of the first terminal matching the identifier of the second terminal, wherein the subscription information corresponding to the identifier of the second terminal is prestored in the access control device, the identifier of the first terminal matching the identifier of the second terminal indicating the first terminal and the second terminal are the same; and
   performing, identity authentication on the second terminal, wherein the performing, identity authentication on the second terminal comprises:
      sending, a first challenge value and a second random number to the second terminal, wherein the first challenge value is calculated by the access control device based on a first key value and a first random number that is from the second terminal, and the first key value is determined by the access control device based on the identifier of the second terminal.

\* \* \* \* \*